United States Patent

Holdsworth

[11] 3,892,835
[45] July 1, 1975

[54] METHOD OF MANUFACTURING HOT PRESSED CERAMIC MATERIAL BASED ON SILICON NITRIDE

[75] Inventor: Martin Richard Holdsworth, Birmingham, England

[73] Assignee: Joseph Lucas (Industries) Limited, Birmingham, England

[22] Filed: Mar. 30, 1973

[21] Appl. No.: 346,597

[30] Foreign Application Priority Data
Apr. 6, 1972 United Kingdom............... 15883/72

[52] U.S. Cl................................... 264/332; 264/338
[51] Int. Cl.............................................. C04b 33/64
[58] Field of Search....................... 264/332, 56, 338

[56] References Cited
UNITED STATES PATENTS

| | | | |
|---|---|---|---|
| 3,221,365 | 12/1965 | Mattern | 264/332 X |
| 3,383,737 | 5/1968 | Greger | 264/332 X |
| 3,589,880 | 6/1971 | Clark | 264/332 X |
| 3,713,193 | 1/1973 | Chiba | 264/332 X |
| 3,717,694 | 2/1973 | Mt. Pleasant | 264/332 X |

*Primary Examiner*—Robert F. White
*Assistant Examiner*—Thomas P. Pavelko
*Attorney, Agent, or Firm*—Hill, Gross, Simpson, Van Santen, Steadman, Chiara & Simpson

[57] ABSTRACT

In manufacturing a hot pressed ceramic material based on silicon nitride, the ceramic material is introduced into a die cavity defined within a graphite die. There is provided between the ceramic material and the walls of the die cavity a further material which, at the elevated temperature of the hot pressing process, forms a substantially non-porous continuous barrier layer at or near the surface of the ceramic material so that reaction between the ceramic material and the graphite die is substantially prevented.

8 Claims, 1 Drawing Figure

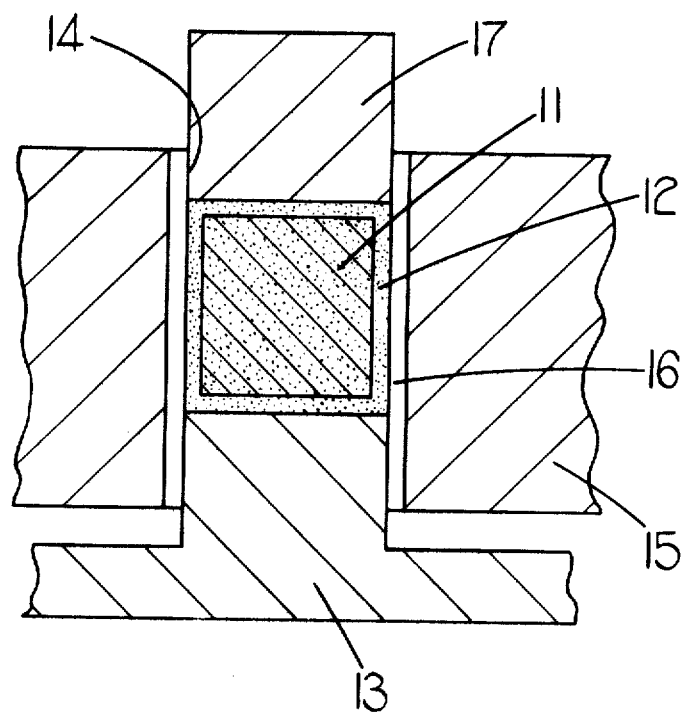

METHOD OF MANUFACTURING HOT PRESSED CERAMIC MATERIAL BASED ON SILICON NITRIDE

This invention relates to a method of and apparatus for manufacturing hot pressed ceramic materials based on silicon nitride.

A method according to the invention, comprises the steps of starting with a graphite die defining a die cavity for receiving the ceramic material to be hot pressed, introducing the ceramic material into the die cavity, and hot pressing the ceramic material, characterised in that there is provided between said ceramic material and the walls of the die cavity a further material which, at the elevated temperature of the hot pressing process, forms a substantially non-porous, continuous barrier layer at or near the surface of the ceramic material so that reaction between the ceramic material and the graphite die is substantially prevented.

Conveniently, the ceramic material is introduced into the die cavity as a preform and said further material is provided as a coating on the surface of the preform presented to the walls of the die cavity.

Alternatively, the ceramic material is introduced into the die cavity as a powder and said further material is provided on the walls of the die cavity presented to said ceramic material.

Apparatus according to the invention, includes a graphite die defining a die cavity for receiving the ceramic material to be hot pressed and is characterised in that there is provided on the walls of the die cavity presented to said material, in use, a further material which, at the elevated temperature of the hot pressing process, forms a substantially non-porous, continuous, barrier layer at or near the surface of the ceramic material so that reaction between the graphite die and the ceramic material is substantially prevented.

Conveniently, where the further material is provided on the walls of the die cavity presented to the ceramic material to be hot pressed, a coating of a release agent is interposed between said further material and the walls of the die cavity. A release agent coating can also be provided on the walls of the die cavity when the ceramic material to be hot pressed is introduced into the die cavity as a preform having said further material thereon.

Conveniently, the release agent is boron nitride.

Preferably, the further material is alumina or an aluminium containing compound which decomposes to alumina at the hot pressing temperature.

The accompanying drawing is a sectional view of apparatus for performing a method according to one example of the invention.

Referring to the drawing, in one example of the invention, silicon nitride powder was first compressed, in any convenient manner, into a preform 11 and the preform was sprayed at room temperature with a suspension of alumina powder in a mixture of collodion and acetone to form a layer 12 covering the whole of the preform. The alumina employed was that supplied by Universal Abrasives Ltd as White Bauxilite Micro Powder and preferably was arranged to have a particle size of less than 1 micron, although powders have mean particle sizes of up to 5 microns were also found to be successful. Conveniently, the alumina suspension contained 5 parts by weight of alumina, 5 parts by weight of collidion and 30 parts by weight of acetone, the suspension being agitated to ensure thorough mixing before the spraying operation. Spraying was arranged so that the layer 12 was sufficiently thick to ensure that none of the underlying black material of the preform 11 was visible beneath the layer 12, this being achieved in the specific example when the preform 11 was coated with 0.1 gm. of the suspension per square inch of the preform. Thicker layers were, however, possible.

The preform 11 with the layer 12 thereon was then positioned on a graphite plug 13 received within a die cavity 14 defined in a graphite die 15, the walls of the die cavity presented to preform 11 having previously been coated with a boron nitride release agent 16. When in position in the die cavity 14, the preform 11 was pressed between a graphite punch 17 and the plug 13 at a pressure of 1.5 tons per square inch and a temperature of 1,720°C. At the hot pressing temperature, the alumina on the preform 11 reacted with the preform to produce at the surface thereof a non-porous continuous, protective layer which, when the preform 11 was maintained at the hot pressing temperature for 20 minutes, penetrated the preform to a depth of 0.01 inch. It was found that this protective layer at the surface of the preform substantially prevented reaction at the hot pressing temperature between the preform and the graphite die to produce silicon carbide. Also, the protective layer produced at the surface of the preform during hot pressing enhanced the high temperature properties of the resultant hot pressed, silicon nitride product.

By way of contrast, it was found that without the alumina layer 12 on the preform 11, there was a considerable tendency for silicon carbide to be produced in the preform during the hot pressing process. This was believed to be caused by a vapour phase reaction between the oxides of carbon from the die 15 and silicon monoxide, which it is thought is produced in the silicon nitride during hot pressing. The effect of using the layer 12 of alumina on the preform is that the alumina reacts with the silicon nitride to produce a silicon aluminium oxynitride layer at the surface of the preform which prevents subsequent diffusion of silicon monoxide to the surface and thereby prevents the formation of silicon carbide. Thus, by use of the protective layer 12 on the preform 11 in the above example, it was found that the useful life of the graphite die 15 was more than 4 times longer than the life of the die when used to hot press silicon nitride without such a protective layer.

In a modification of the above example, the layer 12 was produced on the silicon nitride preform 11 by dipping the preform into a suspension containing 10 percent by volume of alumina, 6 percent by volume of collodion, and 84 percent by volume of acetone. As before, the suspension was agitated before the dipping operation to ensure thorough mixing of the components and also it was found to be desirable to ensure that the particle size of the solids in the suspension was less than 20 microns. Other suspensions were used which contained varying quantities of collodion and it was found to be necessary to employ at least 3 percent by volume of collodion since otherwise the suspension was too thin to give a coherent coating on the preform 11. After the dipping operation, subsequent treatment of the preform 11 proceeded as in the above example.

In a further modification of the above example, the silicon nitride was introduced into the die cavity 14 in the form of a powder and the alumina layer 12 was provided on top of the boron nitride release agent coating 16. Again, the alumina layer 12 produced a non-porous, continuous protective layer between the silicon nitride and the graphite die 15 at the hot pressing temperature, which substantially prevented reaction there between.

Further examples were also carried out in which the particle size of the alumina in the layer 12 was varied and in each case satisfactory results were obtained provided the particle size of the alumina was less than or equal to 25 microns.

It is to be appreciated that, instead of using alumina to provide the layer 12, other compounds of aluminium which would react at the hot pressing temperature with the ceramic material being hot pressed to produce silicon aluminium oxynitride could have been used. Thus, for example, compounds of aluminium, such as aluminium hydroxides, which would decompose to alumina at the hot pressing temperature could have been employed. Also, although in the first example the protective layer produced during hot pressing was allowed to remain on the surface of the hot pressed component to improve its high temperature properties, the layer could have been removed from the hot pressed component.

It is to be appreciated that the method described above can be employed in the manufacture of ceramic material based on silicon nitride, as well as silicon nitride itself. Thus, for example, in the production of a silicon aluminium oxynitride ceramic material by hot pressing in a graphite die a compacted mixture of silicon nitride and alumina, the provision on the surface of the compact of a material which would produce a protective barrier layer at the hot pressing temperature would prevent reaction between the silicon nitride in the compact and the graphite die.

I claim:

1. A method of manufacturing hot pressed ceramic material based on silicon nitride, comprising the steps of starting with a graphite die defining a die cavity for receiving the ceramic material to be hot pressed, introducing the ceramic material into the die cavity, providing a compound of alumina or a compound of aluminium which decomposes to alumina at elevated temperatures between said ceramic material and the walls of the die cavity, heating the ceramic material to an elevated temperature and simultaneously applying pressure to said ceramic material to hot press the material, said compound of alumina or a compound of aluminium which decomposes to alumina at elevated temperatures reacting with the ceramic material at said elevated temperature to form a silicon aluminium oxynitride as a substantially non-porous, continuous barrier layer at or near the surface of the ceramic material so that reaction between the ceramic material and the graphite die is substantially prevented.

2. A method as claimed in claim 1 wherein the ceramic material introduced into the die cavity includes free silicon nitride.

3. A method as claimed in claim 1 wherein the ceramic material is introduced into the die cavity as a preform and said further material is provided as a coating on the surface of the preform presented to the walls of the die cavity.

4. A method as claimed in claim 1 wherein the ceramic material is introduced into the die cavity as a powder and said further material is provided on the walls of the die cavity presented to said ceramic material.

5. A method as claimed in claim 3 wherein the walls of the die cavity presented to the preform are coated with a release agent.

6. A method as claimed in claim 4 wherein a release agent is interposed between said further material and the walls of the die cavity.

7. A method as claimed in claim 5 wherein the release agent is boron nitride.

8. A method as claimed in claim 6 wherein the release agent is boron nitride.

* * * * *